(12) United States Patent
Takano et al.

(10) Patent No.: US 11,664,549 B2
(45) Date of Patent: May 30, 2023

(54) METAL CASE AND BATTERY

(71) Applicant: Panasonic Intellectual Property Management Co., Ltd., Osaka (JP)

(72) Inventors: Akira Takano, Osaka (JP); Oose Okutani, Hyogo (JP); Takeshi Enomoto, Osaka (JP); Masayoshi Yoshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

(21) Appl. No.: 16/582,501

(22) Filed: Sep. 25, 2019

(65) Prior Publication Data
US 2020/0020893 A1    Jan. 16, 2020

Related U.S. Application Data

(63) Continuation of application No. PCT/JP2018/009612, filed on Mar. 13, 2018.

(30) Foreign Application Priority Data

Mar. 31, 2017    (JP) .............................. JP2017-069495

(51) Int. Cl.
| | |
|---|---|
| *H01M 50/107* | (2021.01) |
| *H01M 10/0525* | (2010.01) |
| *H01M 10/0587* | (2010.01) |
| *H01M 50/169* | (2021.01) |
| *H01M 50/152* | (2021.01) |

(52) U.S. Cl.
CPC ..... *H01M 50/107* (2021.01); *H01M 10/0525* (2013.01); *H01M 10/0587* (2013.01); *H01M 50/152* (2021.01); *H01M 50/169* (2021.01)

(58) Field of Classification Search
CPC ............. H01M 50/107; H01M 50/148; H01M 10/0583
See application file for complete search history.

(56) References Cited

U.S. PATENT DOCUMENTS

| | | | |
|---|---|---|---|
| 7,364,817 B2 * | 4/2008 | Lee ....................... | H01M 50/54 429/211 |
| 2010/0226068 A1 | 9/2010 | Kitagawa et al. | |
| 2011/0171504 A1 | 7/2011 | Yasui et al. | |
| 2013/0071727 A1 | 3/2013 | Hirai | |

(Continued)

FOREIGN PATENT DOCUMENTS

| | | | |
|---|---|---|---|
| JP | 09293529 | * | 11/1997 |
| JP | 09293529 A | * | 11/1997 |

(Continued)

OTHER PUBLICATIONS

International Search Report dated May 15, 2018, issued in counterpart Application No. PCT/JP2018/009612. (2 pages).

*Primary Examiner* — Ula C Ruddock
*Assistant Examiner* — Thomas H. Parsons
(74) *Attorney, Agent, or Firm* — WHDA, LLP (57) ABSTRACT

A metal case has a cylindrical body section, an opening section at one end of the body section, the opening section having an opening, and a bottom section closing the other end of the body section. At least one of the body section and the opening section has a protrusion sticking outward in the direction of the radius of the body section.

14 Claims, 6 Drawing Sheets

(56) References Cited

U.S. PATENT DOCUMENTS

| | | |
|---|---|---|
| 2015/0222131 A1 | 8/2015 | Kano |
| 2017/0291502 A1 | 10/2017 | Kano |
| 2019/0148689 A1* | 5/2019 | Keum ................. H01M 50/147 |
| | | 429/151 |

FOREIGN PATENT DOCUMENTS

| | | | |
|---|---|---|---|
| JP | 2000-138051 A | | 5/2000 |
| JP | 2007-234306 A | | 9/2007 |
| JP | 2007234306 | * | 9/2007 |
| JP | 2007-258414 A | | 10/2007 |
| JP | 2011-029425 A | | 2/2011 |
| JP | 2011-159498 A | | 8/2011 |
| JP | 2011-171014 A | | 9/2011 |
| JP | 2012-074321 A | | 4/2012 |
| JP | 2012-094358 A | | 5/2012 |
| JP | 2013-73845 A | | 4/2013 |
| JP | 2016-093319 A | | 5/2016 |
| JP | 2016-129615 A | | 7/2016 |
| WO | 2011/007532 A1 | | 1/2011 |

* cited by examiner

METAL CASE AND BATTERY

TECHNICAL FIELD

The present invention relates to a metal case, in particular a battery can, and to a battery that includes a battery can.

BACKGROUND ART

An ordinary cylindrical battery includes a power-generating element and a bottomed cylindrical battery can that contains the power-generating element. Near the open end of the opening section of the battery can, a portion with an inward annular groove is formed. By placing a cap so that the grooved portion supports it, the opening section is closed.

To put such a battery in a holder, the standard way is to hold the battery from above and below using upper and lower holders, with an elastic material therebetween, and then immobilize by pressing, for example as in PTL 1.

CITATION LIST

Patent Literature

PTL 1: Japanese Published Unexamined Patent Application No. 2013-73845

SUMMARY OF INVENTION

As can be seen from this, battery cans and like metal cases (batteries) have been secured in holders or similar containers primarily by holding and immobilizing the metal case from above and below by pressing; the range of possible securing methods is limited.

In the industrial production of multiple batteries, moreover, it is difficult to produce them to exactly the same size. This has caused a problem: When an assembled battery (battery pack or battery module) is made using cylindrical cell batteries, the bottom surface of the assembled battery is used as the reference surface for assembly. The assembled battery is made by holding the cell batteries in place up from the reference surface for assembly, with multiple components (collector plates, an insulating component, etc.) interposed. As a result, the higher the position of a battery is, the cumulatively greater the positional inaccuracy of the battery is because of the accumulation of errors in the size of the individual components. This unfortunately limits the range of techniques that can be used to make the assembled battery, such as that for welding of the current-collecting path.

In light of this, an aspect of the present disclosure relates to a metal case that has a cylindrical body section, an opening section at one end of the body section, the opening section having an opening, and a bottom section closing the other end of the body section. At least one of the body section and the opening section has a protrusion extending outward in the direction of the radius of the body section.

Another aspect of the present disclosure relates to a battery that includes an electrode assembly, an electrolyte, a battery can containing the electrode assembly and the electrolyte, and a cap closing an opening of the battery can.

The battery can has a cylindrical body section, an opening section at one end of the body section, the opening section having the opening, and a bottom section closing the other end of the body section. Near the open end of the opening section is an annularly grooved portion in which the battery can is constricted. At least one of the body section and the opening section has a protrusion extending outward in the direction of the radius of the body section.

The present disclosure, by virtue of a protrusion on the side of a metal case, allows for easy and precise securing of a battery with the use of the protrusion.

BRIEF DESCRIPTION OF DRAWINGS

FIG. 6 (a) is a cross-sectional view of a battery can according to another embodiment of the present invention, and FIG. 6 (b) is a diagram illustrating how to fasten the protrusion to a holder.

DESCRIPTION OF EMBODIMENTS

A metal case according to an embodiment of the present invention has a cylindrical body section, an opening section at one end of the body section, a bottom section closing the other end of the body section, and at least one protrusion extending outward in the direction of the radius of the body section. The protrusion, present in at least one of the body section and the opening section, makes easier the holding and positioning, at least in the axial direction, of the cylinder of the metal case.

The metal case is a battery can for example, but does not need to be a battery can but may be a case for a capacitor. A protrusion in the body section of a cylindrical electrolytic capacitor, for example, is effective in fixing the position of and preventing vibration of the electrolytic capacitor as well.

If the metal case is a battery can, it is preferred that an annularly grooved portion at which the battery can is constricted lie near the open end of the opening section. Here, the opening section is not exclusively the open end but refers to a region that includes the nearby annularly grooved portion.

It should be noted that constriction refers to a type of processing in which, for example, a jig is pressed against the wall of a battery can from outside, and the can wall is pushed inward along the circumferential surface of the battery can so that the inner surface of the can wall will protrude inward.

The protrusion may be welded, bonded, or otherwise attached to the body or opening section but preferably is formed integrally. Integral formation improves the strength of connection between the protrusion and the battery can. As described hereinafter, the protrusion can be formed integrally with the opening section in a step of crimping the rim of the opening section inward and capping the opening section with a cap (capping step) subsequent to a constriction step. In this case, the protrusion is formed at a position between the annularly grooved portion and the open end in the direction of the axis of the body section.

The protrusion may extend continuously along the circumferential direction at a predetermined position in the direction of the axis of the body section or may extend discontinuously. If the protrusion is continuous, the overall shape of the body section is a structure in which the outer diameter of the body section is large at the predetermined position, a structure that looks as if a so-called "flange" had been formed around the outer circumference of a cylindrical body section. In the following, this type of protrusion may be referred to simply as a "flange."

When a metal case having a protrusion is secured, for example in a holder, it is good to secure it by creating a recess or gap in the holding area of the holder and setting the protrusion into the recess or gap. This fixes the position of the metal case, at least in the direction of the cylindrical axis, thereby ensuring more precise positioning in the axial direction. The assembly work becomes easier, and the range of processing options is expanded. Moreover, the case can be secured more firmly by welding or bonding the sides of the protrusion to the holder.

In the related art, when an assembled battery (battery pack or battery module) is made using cylindrical cell batteries, the bottom surface of the assembled battery is used as the reference surface for assembly. The assembled battery is made by holding the cell batteries in place up from the reference surface for assembly, with multiple components (collector plates, an insulating component, etc.) interposed. As a result, the higher the position of a battery is, the greater the positional inaccuracy of the battery is because of the accumulation of errors in the size of the individual components. With a metal case according to this embodiment, in contrast, the use of the protrusion eliminates the need for multiple interposed components in making an assembled battery. The variations in the positions of the batteries, moreover, are small because the reference for positioning is the position of the protrusion. The positioning of the batteries and that of welding areas become more precise. As a result, the range of possible assembly techniques is no longer limited.

The shape of the protrusion does not need to be one in which the protrusion extends in the direction perpendicular to the axis of the body section. For example, the protrusion may extend in a direction oblique at a predetermined angle to the vertical to the axis. Alternatively, for example, the shape of the protrusion may be one in which the protrusion has a side bent or curved in the direction of the axis of the body section.

If the protrusion is made obliquely to the vertical to the axis or if the protrusion has a bent or curved side, the protrusion functions as a hook for anchoring the metal case to a holder by virtue of having a side that is oblique to the plane perpendicular to the axis of the body section. This helps secure the metal case precisely and more firmly while leaving the case detachable from the holder. The oblique side also allows the position of the metal case in the direction perpendicular to the axis to be fixed as well as the position in the axial direction is fixed.

Figure 1:
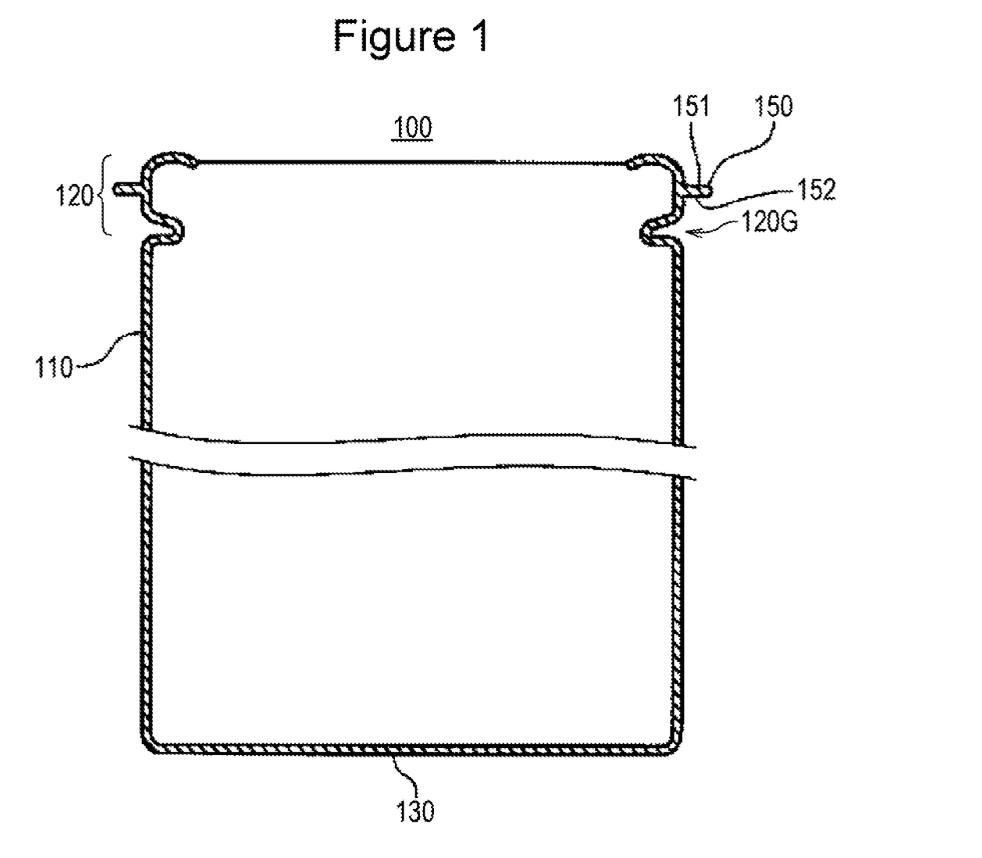
FIG. 1 is a longitudinal cross-sectional view of a battery can according to an embodiment of the present invention.

FIG. 1 illustrates an example of a battery can as a metal case having a protrusion in its enlarged cross-sectional view. FIGS. 2(a) and 2(b) present enlarged cross-sectional views of a portion around the protrusion of the battery can. It should be noted that the battery can illustrated in FIG. 1 has been constricted and capped, so the inside of the battery can has already been packed with an electrode assembly and an electrolyte. Their graphical representation, however, is omitted in FIG. 1 to avoid complexity. FIG. 1, moreover, is a schematic diagram drawn with particular emphasis on the protrusion and constriction, so the relative dimensions of the illustrated protrusion and other elements of the battery do not necessarily match actual relative dimensions. The same apples to the subsequent drawings.

The battery can 100 has a cylindrical body section 110, an opening section 120 at one end of the body section 110, and a bottom section 130 closing the other end of the body section 110. Near the open end of the opening section 120 is an annularly grooved portion 120G formed by constriction. Between the annularly grooved portion 120G and the open end is a protrusion (flange) 150. The protrusion 150 has two sides 151 and 152.

Here, a "side" of the protrusion is defined as one of the faces forming the surface of the protrusion and a face that extends along the direction in which the protrusion extends out and substantially parallel to the direction in which the protrusion extends. In FIG. 1, the upper and lower faces (faces perpendicular to the axis of the body section) of the flange are the sides 151 and 152, respectively, of the protrusion 150.

Figure 2:
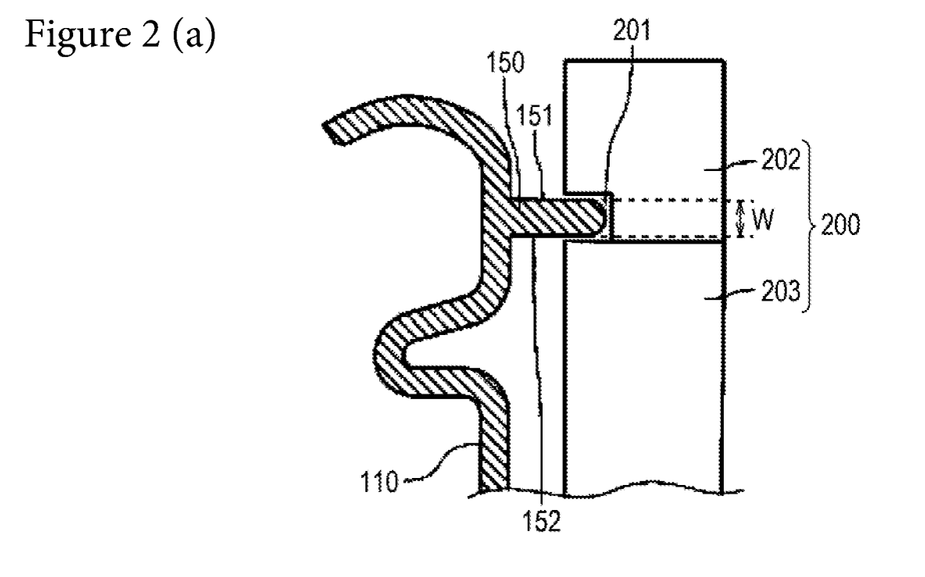
FIGS. 2(a) and 2(b) are enlarged cross-sectional views of a portion around the protrusion of the battery can and diagrams illustrating how to fasten the protrusion to a holder.

This battery can 100 is secured in a holder 200 as follows. In the example illustrated in FIG. 2 (a), this is done in such a manner that the protrusion 150 comes into a gap 201 created by a holder 200 that includes an upper holder 202 and a lower holder 203. Then at least one of the sides 151 and 152 is welded or bonded to the holder 200 to make the hold in the holder 200 firmer. Alternatively, in the example illustrated in FIG. 2 (b), the battery can 100 is secured in the holder 200 by bonding the lower side 152 of the protrusion 150 to the upper surface of the holder 200. It should be noted that FIG. 2 (b) illustrates a case in which the protrusion 150 has a cross-sectional shape that is thicker at its base than at its distal end. This improves the strength of the protrusion. A thicker base also leads to a stronger fixation by increasing the area of the lower side 152, at which the battery can 100 is bonded.

Regarding the length (height) H to which the protrusion extends out, it is preferably a length between 1% and 50% of the radius of the body section, although depending on the size of the battery can and the materials of which the battery can and the holder are made. Likewise, for the width (thickness) of the protrusion, it is preferred that the maximum thickness W of the protrusion be between 0.3 and 10 times the wall thickness of the body section, although depending on the size of the battery can and the materials of which the battery can and the holder are made.

Figure 3:
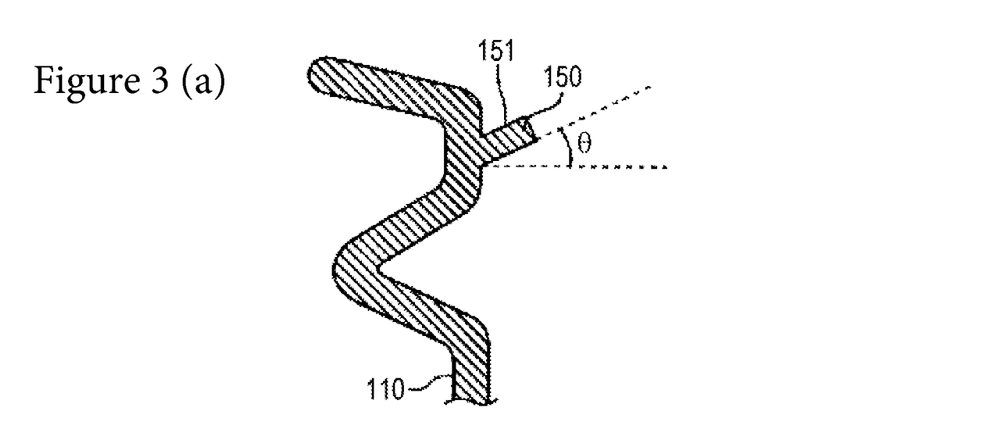
FIGS. 3(a)-(c) present enlarged cross-sectional views of a portion around the protrusion, illustrating variations of the battery can in FIGS. 2(a) and 2(b).

FIGS. 3(a)-(c) present enlarged cross-sectional views of a portion around the protrusion of battery cans and illustrate variations, different than in FIGS. 2(a) and 2(b), in the shape of the protrusion. In FIG. 3 (a), the protrusion 150 projects out in a direction slightly oblique to the vertical to the axis of the body section. In FIG. 3 (b), one of the sides 151 and 152 (side 151) is a curved surface, a surface curved in the direction of the axis of the body section. In FIG. 3 (c), the side 151 includes two sides 151a and 151b bent in the direction of the axis of the body section.

In FIG. 3 (a) to (c), the protrusion 150 has been formed with one of its sides (side 151) oblique to the plane perpendicular to the axis of the body section. By virtue of this, the protrusion 150 functions as a hook for anchoring the battery can 100 to a holder 200. This allows the battery can 100 and a holder 200 to be tied together precisely, and immobilizing the hook-shaped protrusion by holding it between portions of the holder will limit displacement in the direction perpendicular to the axis of the battery can (transverse direction) besides limiting displacement in the direction of the axis of the battery can. In FIG. 3 (a), the angle of inclination θ of the protrusion 150 is preferably in the range of −45° to +45°.

The transverse cross-sectional shape of the body section of the battery can is typically round or a nearly round shape, but these are not the only options. The length, inner diameter, and wall thickness of the body section are not critical either. The width to which the grooved portion protrudes inward (depth of the groove), which is determined by the size of the battery, is not critical either.

The material for the battery can is, to name a few, iron, an iron alloy, stainless steel, aluminum, or an aluminum alloy but is not critical.

The type of the battery is not critical, but by way of example, the battery can described above is suitable for use as a battery case for lithium ion secondary batteries to be incorporated in those battery modules that require high resistance to vibrations.

Next is described an example of a cylindrical battery that uses a battery can as described above.

The cylindrical battery includes an electrode assembly, an electrolyte, a battery can containing the electrode assembly and the electrolyte, and a cap closing an opening of the battery can. More specifically, between the annularly grooved portion of the battery can and the end face of the electrode assembly closer to the opening section, a first insulating plate is placed to prevent internal short-circuiting. Likewise, between the bottom section of the battery can and the end face of the electrode assembly closer to the bottom section, a second insulating plate is placed.

The first and second insulating plates are made of a material that is primarily an insulating resin, such as an epoxy resin, and preferably are ones formed by a core and an insulating fibrous material contained therein.

Figure 4:
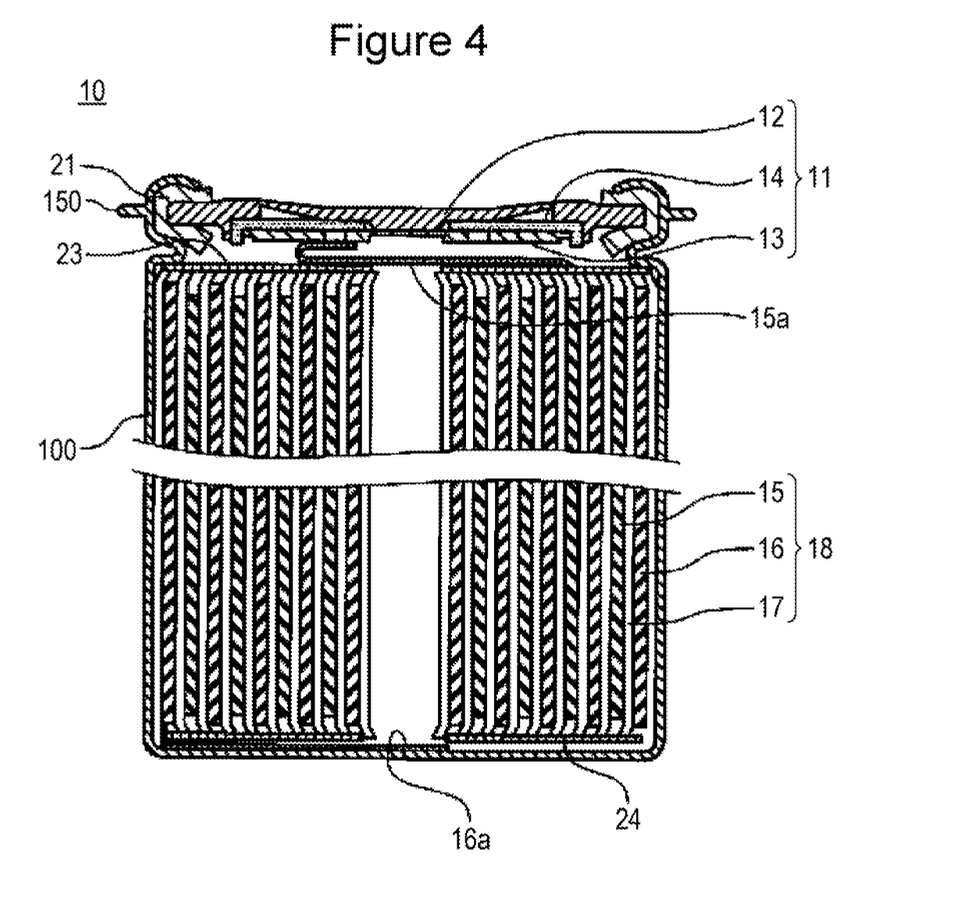
FIG. 4 is a longitudinal cross-sectional view of a battery according to an embodiment of the present invention.

The following describes a cylindrical battery according to an embodiment of the present invention, taking a lithium ion secondary battery as an example, with reference to FIG. 4. FIG. 4 is a longitudinal cross-sectional view of a lithium ion secondary battery.

The lithium ion secondary battery (hereinafter the battery) 10 includes an electrode assembly 18, an electrolyte (not illustrated), and a battery can 100 containing them. The electrode assembly 18 is formed by a positive electrode plate 15, a negative electrode plate 16, and a separator 17, with the electrode plates wound together with the separator 17 therebetween. Near the open end of the battery can 100 is an annularly grooved portion 120G. Between one end face of the electrode assembly 18 and the annularly grooved portion 120G is a first insulating plate 23. Between the other end face of the electrode assembly 18 and the bottom section 130 of the battery can 100 is a second insulating plate 24.

The opening section of the battery can 100 is closed with a cap 11 fitted with a gasket 21 around its periphery. The cap 11 includes a valve 12, a metal plate 13, and an annular insulating member 14 interposed between the outer periphery of the valve 12 and that of the metal plate 13. The valve 12 and the metal plate 13 are connected together at their respective centers. The positive electrode lead 15a, from the positive electrode 15, is connected to the metal plate 13. The valve 12 therefore functions as the outer terminal of the positive electrode. The negative electrode lead 16a, from the negative electrode 16, is connected to the inner surface of the bottom section of the battery can 100.

The positive electrode plate 15 includes a foil positive electrode current collector and a positive electrode active material layer formed on its surface. The positive electrode current collector can be made of, for example, aluminum, an aluminum alloy, stainless steel, titanium, or a titanium alloy. The positive electrode active material is preferably a lithium transition metal composite oxide. For example, a composite oxide that contains at least one selected from the group consisting of cobalt, manganese, nickel, chromium, and iron and also contains lithium is used.

The negative electrode plate 16 includes a foil negative electrode current collector and a negative electrode active material layer formed on its surface. The negative electrode current collector can be made of, for example, copper, a copper alloy, nickel, a nickel alloy, or stainless steel. The negative electrode active material can be a carbon material capable of reversible storage and release of lithium ions, such as natural graphite, artificial graphite, hard carbon, or soft carbon, tin oxide, or silicon oxide.

The separator 17 can be, for example, a microporous film formed from a polyolefin. Examples of polyolefins include polyethylene, polypropylene, and ethylene-propylene copolymers.

The electrolyte includes a nonaqueous solvent and a lithium salt dissolved in the nonaqueous solvent. The nonaqueous solvent is, for example, a cyclic carbonate, such as ethylene carbonate, propylene carbonate, or butylene carbonate, a linear carbonate, such as dimethyl carbonate, diethyl carbonate, or ethyl methyl carbonate, a carboxylate, or a linear ether. The lithium salt is, for example, $LiPF_6$, $LiBF_4$, or $LiClO_4$.

Next is described how to form a protrusion on a battery can. In this embodiment, the formation of the protrusion 150 is done in a step in which the opening section of the battery can 100 is closed with a cap 11; the protrusion 150 is formed in the same step as capping.

In such a capping step, the side of the opening section is pressed between upper and lower dies of a capping die to form the protrusion, and then the rim of the opening section is crimped, with a gasket 21 inserted, to cap the opening section. This results in integral formation of the protrusion 150 with the opening section. By changing the shape of the capping die, a protrusion in any desired shape can be formed.

Figure 5:
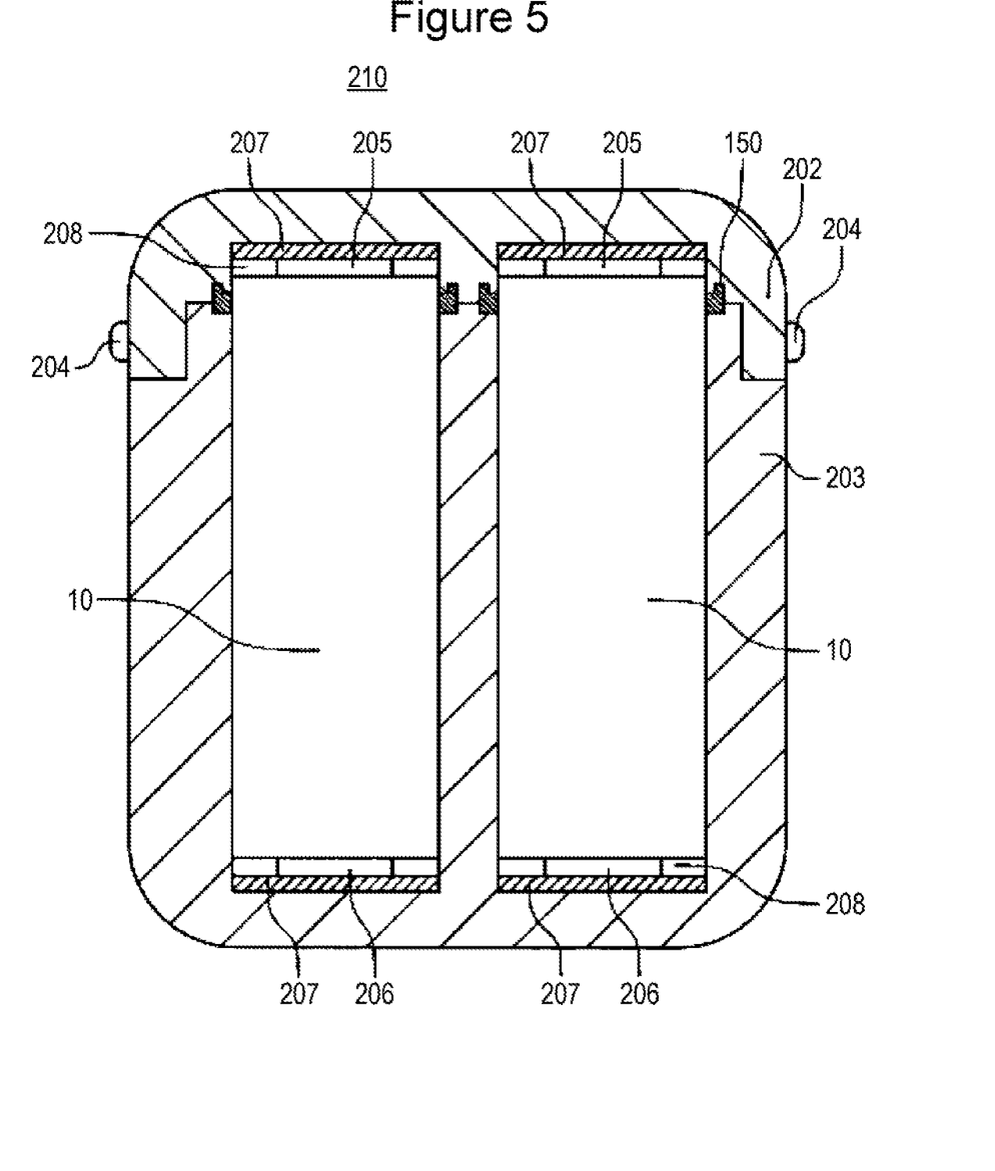
FIG. 5 is a cross-sectional view of a battery module formed by batteries according to an embodiment of the present invention and a holder in which the batteries have been set.

FIG. 5 is a cross-sectional diagram illustrating an example of a battery module 210 formed by cylindrical batteries according to an embodiment of the present invention and a holder in which the batteries have been set. In FIG. 5, two batteries 10 set and secured in a holder 200 are illustrated. The holder 200 includes an upper holder 202 and a lower holder 203. The upper and lower holders 202 and 203 are screwed together with screws 204.

The batteries 10 are configured so that their two electrodes, positive and negative, come into contact with a leaf spring (connection) 205 placed in the upper holder 202 and a leaf spring (connection) 206 disposed in the lower holder 203, to allow the batteries 10 to supply power. The leaf springs 205 and 206 are each connected to a current-collecting section 207, coupling adjacent batteries 10 together. The periphery of the leaf springs 205 and 206, which does not come into contact with a battery 10 or current-collecting sections 207, is surrounded by an insulating section 208.

The upper and lower holders 201 and 202, moreover, hold hook-shaped protrusions 150 from above and below. This determines the position of the batteries 10 in the holder and immobilizes the batteries 10 to prevent the batteries 10 from moving in the axial direction (direction toward the top or bottom of the holder) or in the direction perpendicular to the axis (transverse direction).

Figure 6:
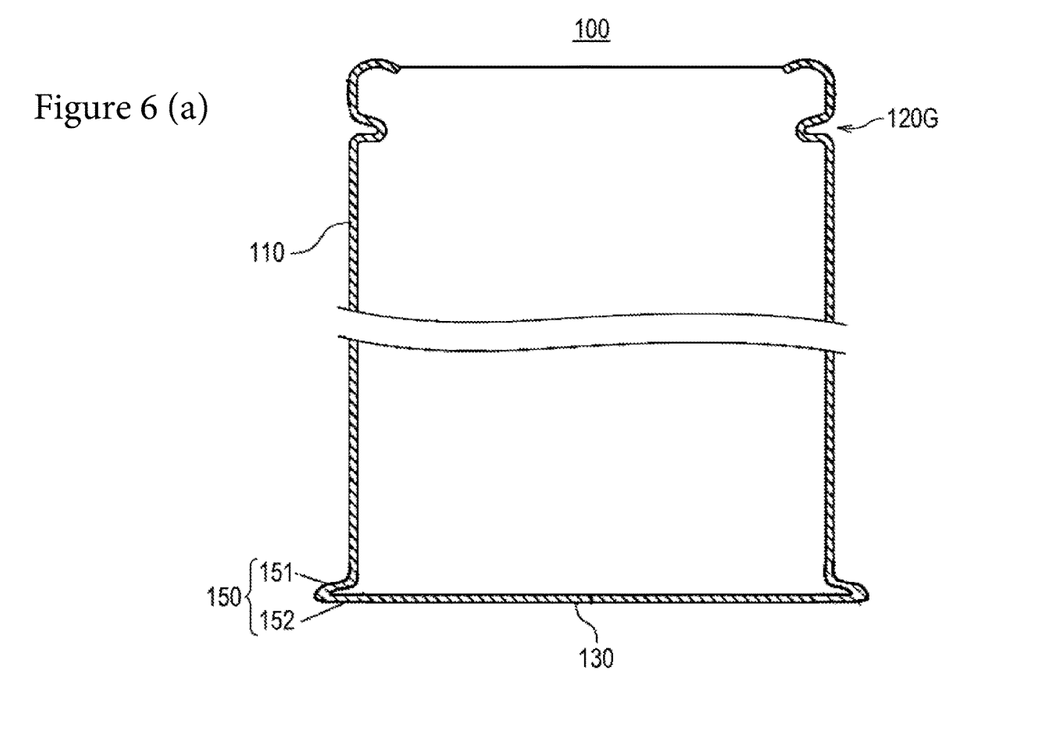

FIG. 6 presents a cross-sectional view of another example of a battery can as a metal case having a protrusion and an enlarged diagram illustrating how to hold the protrusion of the battery can with a holder.

There is a protrusion (flange) 150 made to be flush with the bottom section 130. The protrusion 150 has two sides 151 and 152 and, by virtue of the lower side 152 being continuous with the bottom section 130, is flush with the bottom section 130.

The protrusion 150 is held from above and below by an upper holder 202 and a lower holder 203. This determines the position of the battery 10 and immobilizes the battery 10 to prevent it from moving in the transverse direction.

The lower holder 203 may be equipped with a cooling mechanism for cooling the battery 10, preferably a liquid cooling mechanism, which works by allowing a coolant to flow therethrough, or an air cooling mechanism, which is provided by a fan for example, formed there.

Especially if a cooling mechanism has been placed in such a way, making the protrusion at the position at which it will be flush with the bottom section 130 will help promote the cooling effects of the battery 10 with the lower holder 203 by increasing the area of placement between the lower holder 203 and the bottom section 130 of the battery.

INDUSTRIAL APPLICABILITY

The metal case according to the present invention is useful as a battery can, in particular for use as a battery can for lithium ion secondary batteries to be incorporated in those battery modules that require high resistance to vibrations.

REFERENCE SIGNS LIST

10 Lithium ion secondary battery
11 Cap
12 Valve
13 Metal plate
14 Insulating member
15 Positive electrode plate
15a Positive electrode lead
16 Negative electrode plate
16a Negative electrode lead
17 Separator
18 Electrode assembly
21 Gasket
23 First insulating plate
24 Second insulating plate
100 Battery can
110 Body section
120 Opening section
120G Annularly grooved portion
121G Narrowest section
122G Upper-groove section
123G Lower-groove section
30 Bottom section
150 Protrusion
151, 152 Sides of the protrusion
200 Holder
201 Gap
202 Upper holder
203 Lower holder
204 Screw
205, 206 Leaf springs
207 Current-collecting section
208 Insulating section
210 Battery module

The invention claimed is:

1. A metal case comprising:
a cylindrical body section;
an opening section at one end of the body section, the opening section having an opening; and
a bottom section closing the other end of the body section,
wherein at least one of the body section and the opening section has a protrusion extending outward in a direction of a radius of the body section,
wherein the cylindrical body section continuously extends from the bottom section to the opening section,
wherein the protrusion is disposed between one edge of the opening section and the bottom section, and
wherein the one edge of the opening section is farther from the cylindrical body section than another edge of the opening section is, the another edge and the one edge of the opening section being opposite each other in an axial direction along which an axis of the cylindrical body section extends,
wherein the protrusion has an inner end in the direction of the radius of the body section, the inner end being joined to the at least one of the body section and the opening section, and
the at least one of the body section and the opening section extends from the inner end continuously upwardly and downwardly in the axial direction.

2. The metal case according to claim 1, further comprising:
an annularly grooved portion at which the metal case is constricted; wherein
the protrusion is positioned between the annularly grooved portion and the open end in the axial direction of the axis of the body section.

3. The metal case according to claim 1, wherein the protrusion extends along a circumferential direction at a position in the axial direction of the axis of the body section.

4. The metal case according to claim 1, wherein the protrusion has a side oblique to a plane perpendicular to the axis of the body section.

5. The metal case according to claim 4, wherein the side is bent in the axial direction of the axis of the body section.

6. The metal case according to claim 4, wherein the side is curved in the axial direction of the axis of the body section.

7. The metal case according to claim 4, wherein the protrusion is extends out in a direction oblique to a vertical to the axis of the body section.

8. The metal case according to claim 7, wherein the protrusion extends out at an angle in a range of −45° to +45° to the vertical to the axis of the body section.

9. The metal case according to claim 1, wherein a length H to which the protrusion extends out is a length between 1% and 50% of the radius of the body section.

10. The metal case according to claim 1, wherein a maximum thickness W of the protrusion is between 0.3 and 10 times a wall thickness of the body section.

11. The metal case according to claim 1, further comprising:
an annularly grooved portion at which the metal case is constricted; wherein
the protrusion is positioned between the annularly grooved portion and the bottom section in the axial direction of the axis of the body section.

12. The metal case according to claim 11, wherein the protrusion is flush with the bottom section.

13. A battery comprising:

an electrode assembly;
an electrolyte;
the battery can according to claim 1 containing the electrode assembly and the electrolyte; and
a cap closing an opening of the battery can.

14. The metal case according to claim 1, wherein an interface between the opening section and the bottom section is free of an overlap therebetween in the direction of the radius of the body section.

\* \* \* \* \*